United States Patent [19]

Meyers

[11] Patent Number: 4,952,756

[45] Date of Patent: Aug. 28, 1990

[54] COVER PLATE FOR INDOOR RECEPTACLES

[76] Inventor: Joel Meyers, 11 Wynn Road, Willowdale, Ontario, Canada, M2R 1S5

[21] Appl. No.: 380,496

[22] Filed: Jul. 17, 1989

[51] Int. Cl.⁵ .............................................. H05K 5/03
[52] U.S. Cl. ...................................... 174/67; 439/136
[58] Field of Search ......................... 174/67; 220/242; 439/136

[56] References Cited

U.S. PATENT DOCUMENTS

| | | | |
|---|---|---|---|
| 4,607,136 | 8/1986 | Thomas | 174/67 |
| 4,793,818 | 12/1988 | Poirier | 439/140 |
| 4,810,833 | 3/1989 | Meyers | 174/67 |

Primary Examiner—Leo P. Picard
Assistant Examiner—David A. Tone
Attorney, Agent, or Firm—Ridout & Maybee

[57] ABSTRACT

A spring loaded cover for indoor receptacles such as an electrical outlet is provided to prevent damage to the receptacle and electric shock to children resulting from insertion of objects into an electrical receptacle. The cover has a base plate having longitudinal flanges extending from its top surface. A cover plate has longitudinal slots which coact with the flanges of the base plate to allow the cover plate to slide relative to the base plate. Springs force the cover plate to a closed and locked position upon release, or upon removal of a plug from the receptacle. Stops on the cover and base plates limit the travel of the cover plate, and resilient locking device engages the cover plate when in the covered position.

10 Claims, 3 Drawing Sheets

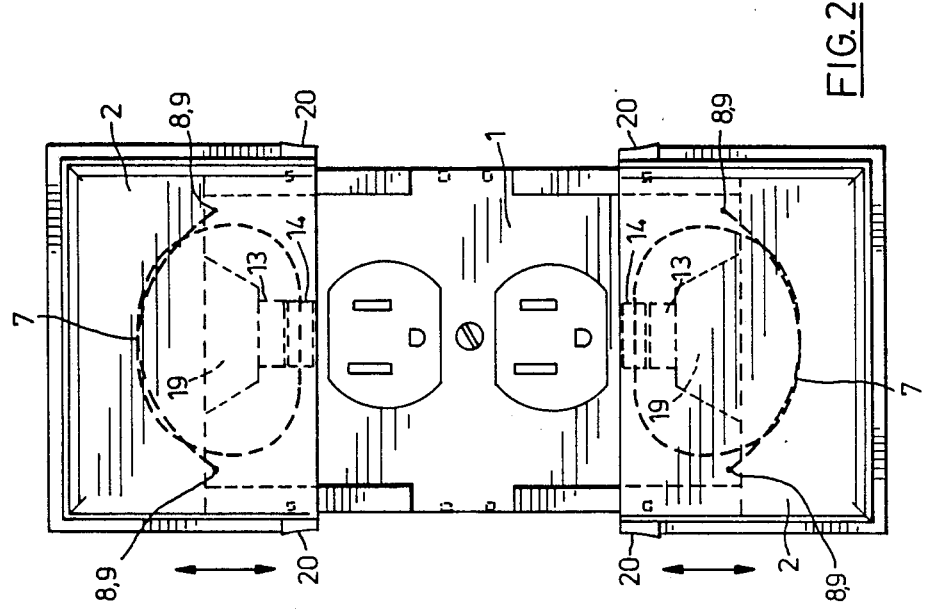
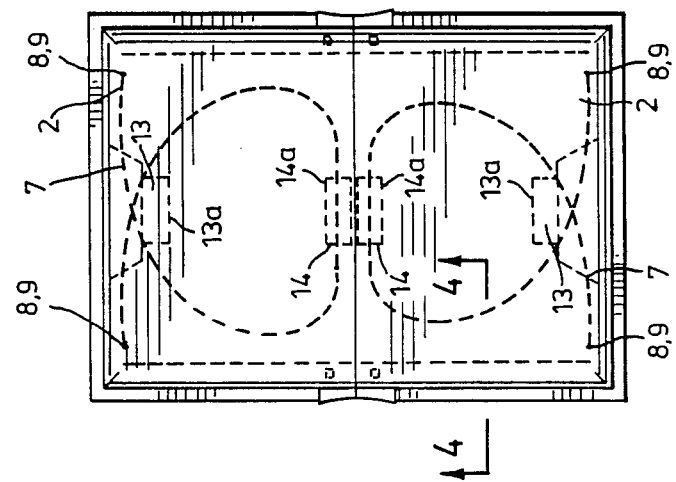

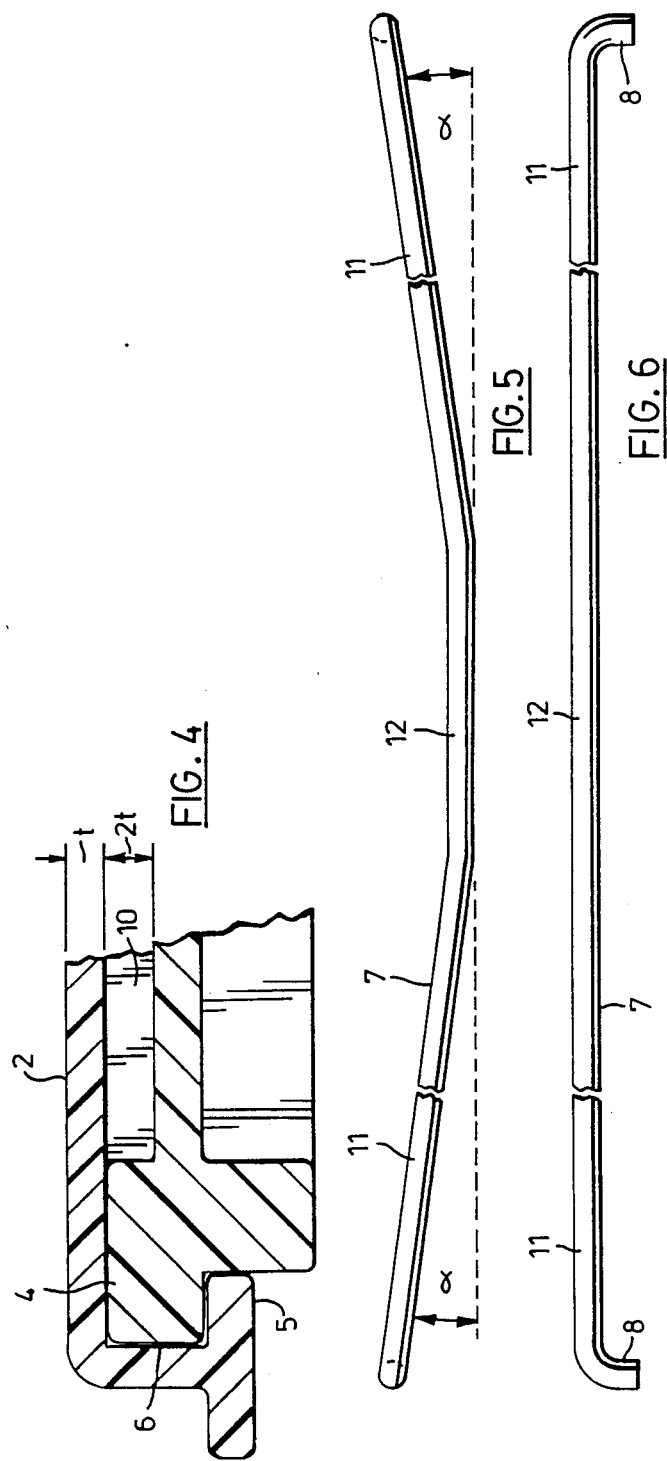

COVER PLATE FOR INDOOR RECEPTACLES

This invention relates to protective devices for indoor receptacles such as electrical outlets, telephone jack outlets, cable television jack outlets, speaker jacks and built in central vacuum cleaner receptacles. Such receptacles are generally vertically mounted on walls within 0.5 metres (1.5 ft) of the floor level. At this height the receptacles are accessible to curious infants and young children. Of particular concern is the tendency of children to insert fingers, or while playing with metallic objects such as spoons, or keys, to insert such objects into the electrically charged openings of electrical outlets. Other plug receptacles may be damaged by the insertion of objects in a like manner. Wall mounted indoor plug receptacles are often unattractive and are not easily incorporated into an indoor decorating scheme. If care is not taken during painting of a wall having receptacles, the openings of a receptacle may be filled with paint which obstructs access.

In addition air infiltration through the openings of receptacles results in loss of heat and in water vapour condensation within the insulation or interior cavity of the walls upon which the receptacle is mounted. Such condensation causes deterioration of the building materials, and reduces the efficiency of the insulation.

Conventional protective cover plates for electrical receptacles are described in U.S. Pat. Nos. 4,607,136 to Thomas (Aug. 19, 1986) and 4,810,833 to Meyers (Mar. 7, 1989), comprising: a base plate having openings shaped to allow access to the electrical outlet; a cover plate; and guide means to engage the base plate and cover plate together such that the cover plate may slide relative to the base plate between an open position and a closed position to alternately expose and cover the openings. Conventional covers may include a cover plate having two portions symmetrically positioned about the centre of the base plate. The two portions slide in opposite directions to each independently expose or cover a single opening. Conventional covers may also include stop means to limit the travel of the cover plate relative to the base plate and locking means to secure the cover plate in a closed position. The locking means are designed such that an infant or young child, due to the size and strength of their hands, cannot release the cover plate to expose the electrical outlet. Locking means, that must be simultaneously released, are positioned on opposite sides of each cover plate portion approximately 70 mm (2¾inches) apart. An adult can easily release the locking means with one hand while a young child, having a smaller hand, cannot. The coordination, dexterity, manual strength and mental concentration required to simultaneously release both locking means while also sliding the cover plate, are usually beyond the physical capabilities and attention span of infants and young children.

The present invention relates to a cover plate for a receptacle wherein the cover plate is retracted to a closed position by biasing means such as for example a metal spring.

According to the present invention is provided a cover for a receptacle, comprising: a base plate having a top and bottom surface and having openings shaped to allow access to the receptacle; a cover plate having a top and bottom surface; guide means to engage said base plate and cover plate together such that said cover plate may slide relative to said base plate between an open position and a closed position to alternately expose and cover said openings; biasing means engaging said base plate and said cover plate, said biasing means exerting a force upon said cover plate biasing said cover plate from an open position to a closed position.

Further according to one embodiment of the invention said biasing means comprise at least one metal spring constructed of metal wire formed into a loop pivotally connected at its ends to the top surface of the base plate and connected at its linear midpoint to the bottom surface of the cover plate.

In addition to preventing electrical shocks to children and damage to various receptacles, the cover plates reduce air infiltration through the openings of a receptacle. The cover in a preferred embodiment is made of material such as CYCOLAC A.B.S.* that is suitable for painting with commonly used household paints. Since the cover may be painted in any colour the receptacle is easily incorporated into an indoor decorating scheme and together with the smooth outer appearance of the cover an attractive less intrusive receptacle results.

* Trade-mark

In order that the invention may be readily understood, a preferred embodiment of the invention as applied to an electrical outlet is described below with reference to the accompanying drawings in which:

FIG. 1 is an elevation view of the outer surface of the invention, as attached to a wall mounted electrical outlet, in a closed position, showing the covered spring in dashed outline.

FIG. 2 is an elevation view of the invention in an open position, showing the covered spring in dashed outline.

FIG. 4 is a transverse sectional view of the invention along line 4—4 of FIG. 1.

FIGS. 5 and 6 are respectively a plan view of the spring in the plane of the loop and an elevation view of the spring transverse to the plane of the loop, both in an unstressed condition.

Figure 3:
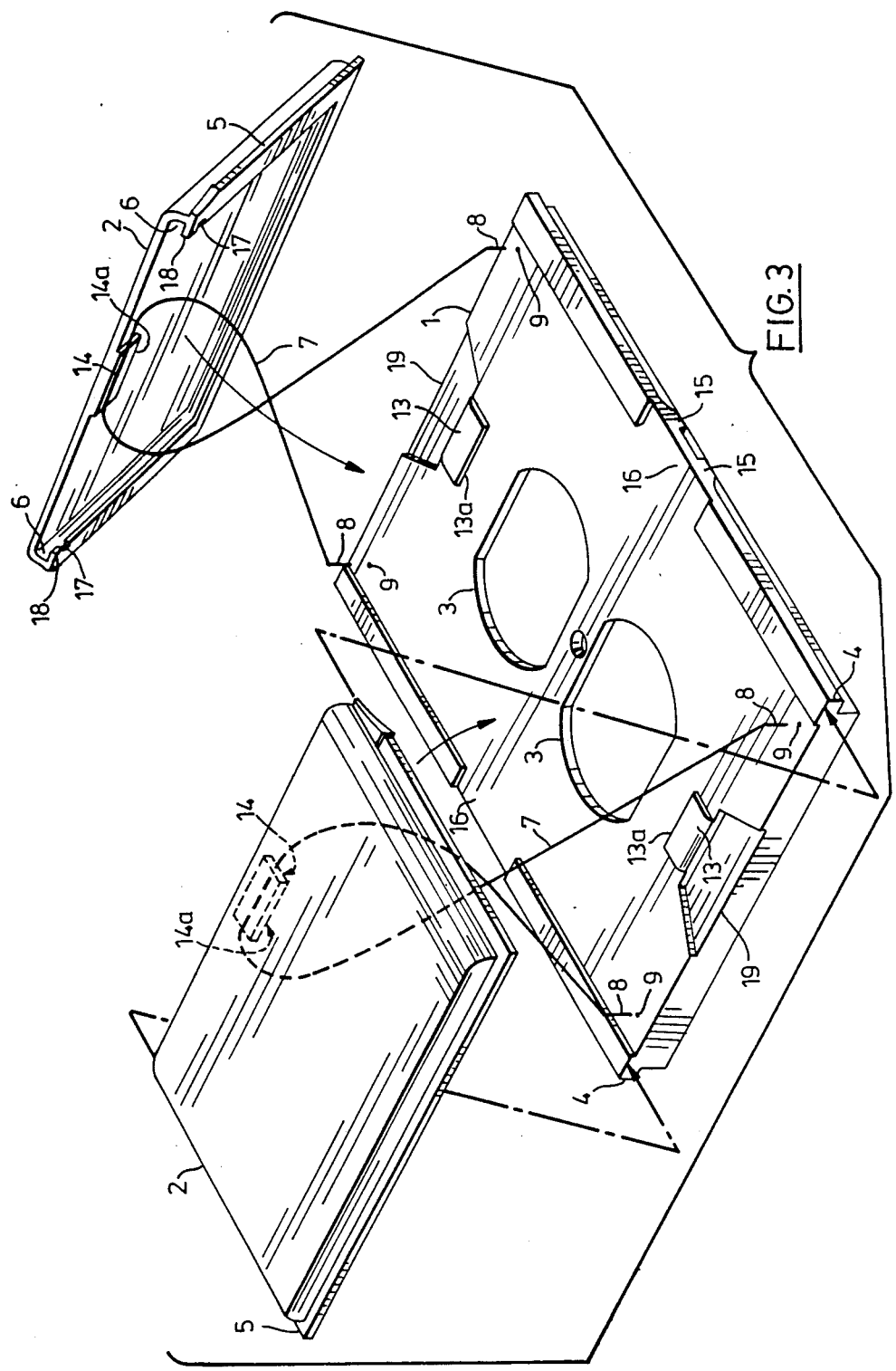
FIG. 3 is a three dimensional exploded view of the outer surface of the base plate and inner and outer surfaces of the cover plate, showing the spring enclosed between the base plate and cover plate.

Although the drawings and the following description relates to an embodiment of the invention applied to an electrical outlet, it should be understood that the invention can be applied to various other plug receptacles such as telephone jack outlets, cable television jack outlets, speaker jacks, and central vacuum cleaner outlets.

Referring to FIG. 3, a cover for an electrical outlet comprises a base plate 1 having openings 3 shaped to accommodate and allow access to a standard two receptacle outlet. The base plate 1 is preferably of length and width greater than those of a standard electrical receptacle plate to cover the access hole made in the wall upon which the plate is mounted to prevent air infiltration through the wall, to ensure the irregular edges of the hole are not visible, and to further ensure that a child, having a small hand, cannot open the cover plates. Preferably a cover plate 2 comprises a first and second portion positioned symmetrically about the centre of the base plate 1 and slidable in opposite directions. In the embodiment shown a flange 4 projects laterally from the longitudinal edges of the top surface of the base plate 1. The flange 4 also projects upwardly from the top surface of the base plate 1. The cover plates 2 have a peripheral outer rim 5 which together with the bottom surface of the cover plate 2 defines longitudinal outer slots 6. As shown clearly in FIG. 2 the rim 5 may have inwardly recessed grips 20, to facilitate gripping of the cover plate by the thumb and a finger of an adult's hand, spanning from one side of the cover plate 2 to the other side.

Referring to FIGS. 3 and 4, the slots 6 of the cover plate 2 engage the flanges 4 of the base plate 1. The cover plates 2 are guided such that they may slide longitudinally relative to the base plate 1 between an open position (as shown in FIG. 2) and a closed position (as shown in FIG. 1) to alternately expose and cover the openings in the base plate 1.

Referring to FIG. 3, biasing means are provided preferably in the form of metal springs 7. The springs 7 engage the base plate 1 and the cover plates 2 and exert a force on the cover plates 2 biasing the cover plates 2 from an open position to a closed position.

Referring to FIGS. 3, 5 and 6 the structure of the springs 7 is illustrated. In a preferred embodiment of the invention the springs 7 comprise a metal wire formed into a loop pivotally connected at its ends to the top surface of the base plate 1 and connected at its linear midpoint to the bottom surface of the cover plates 2. As shown most clearly in FIG. 6, the wire has a pin portion 8 on both ends formed by bending the ends of the wire perpendicularly to the plane of the loop. As shown in FIG. 3, the top surface of the base plate 1 has indentations 9 which house the pin portions 8 pivotally connecting the springs 7 to the base plate 1.

Referring to FIG. 4, since the flange 4 projects upwardly from the top surface of the base plate 1, a pocket 10 is formed between the top surface of the base plate 1 and the bottom surface of the cover plate 2. In the embodiment shown in the drawings the springs 7 are housed within this pocket 10 such that the springs 7 are covered by the bottom surface of the cover plate 2 whether the cover plate 2 is in the open or closed position (as shown in FIGS. 2 and 1 respectively). As illustrated in FIGS. 1 and 2 the spring 7 crosses over itself along the symmetrical centre line of the loop. An indentation 19 is provided in the upper surface of the base plate 1 to increase the depth of the pocket 10 within the area in which the spring 7 crossover moves as the cover plate 2 moves from a closed position to an open position. The indention 19 provides the additional clearance required between the base plate 1 and the cover plate 2 to accommodate the spring 7 crossover.

Referring to FIGS. 1 and 2, the functioning of the springs 7 is clearly illustrated. When the cover plates 2 are in the closed position shown in FIG. 1, the springs 7 are formed into a loop, the pin portions 8 of which are pivotally connected to the base plate 1 within the indentations 9. Springs 7 are constructed of metal wire preferably spring steel which when formed into such a loop, will exert a force upon the cover plate 2 tending to bias it to a closed position as the spring 7 tends to return to its unstressed shape. In the embodiment illustrated in the drawings the preferred unstressed shape of the springs 7 is shown in FIG. 5, although depending on the elasticity of the spring 7 material other unstressed shapes including a straight shape may be used. The preferred unstressed shape of the spring 7 as shown in FIG. 5 is such that the wire is symmetrically bent, in the plane of the loop, prior to being formed into a loop. The wire is bent having outer portions 11 angularly offset (at an angle α) in the same direction, from the middle portion 12. Preferably the offset is in the range where the offset angle α is between 5° and 15°. By varying the offset (angle α) and the elasticity of the spring 7 material, the force exerted by the spring may be varied as desired. Also during assembly of the spring 7 to the cover plate, the spring 7 may be accurately positioned and connected at its linear midpoint using the middle portion 12 and outer portions 11 as a guide.

Referring to FIG. 2, as the cover plates 2 slide from a closed position to an open position, the springs 7 are coiled, further stressing the springs 7 beyond their unstressed shape. The springs 7 therefore exert further force upon the cover plates 2 biasing the cover plates towards a closed position.

In order to limit the travel of the cover plates 2 relative to the base plate 1, conventional stop means are provided. Referring to FIG. 3, lower abutments 13 project from the base plate 1 top surface and an upper abutment 14 projects from each cover plate 2 bottom surface. The abutments 13 and 14 have transverse edges 13a and 14a which engage one another when the cover plates 2 are in the open position as shown in FIG. 2. The lower abutment 13 preferablY has a varying thickness which is greatest at the abutting edge and tapers downwardly toward the base plate 1 surface. The wedge shape of the lower abutment 13 allows the upper abutment 14 to ride over lower abutment 13 when the cover plate 2 is assembled to the base plate The cover plate 2 flexes upwardly as it slides over the base plate 1 allowing the upper abutment 14 to ride over the lower abutment 13 during assembly. In the embodiment shown in the drawings the springs 7 are connected at their linear midpoints to the upper abutments 14 of the cover plates 2 by inserting the springs 7 in a groove formed in the upper abutment 14. The spring 7 may be retained by conventional means such as resilient clips, adhesives or filler plastic material heat sealed in the groove enveloping the spring 7 middle portion 12. Preferably the width of the upper abutment 14 is slightly less than the length of the spring's middle portion 12. In such a case during assembly, accurate positioning of the spring 7 is facilitated using the middle portion 12 as a guide ensuring that the spring 7 is connected at its linear midpoint.

In the particular embodiment shown in the drawings, the cover for an electrical outlet has two cover plates 2 symmetrically disposed about the centre of the base plate 1. Both cover plates 2 can slide independently in opposing directions to cover or expose either receptacle of the outlet. It should be appreciated that a single cover plate covering both receptacles in the covered position is also within the ambit of this invention.

When the cover plates 2 are exposed and an electric plug is inserted into the electrical outlet, the springs 7 bias the cover plate against the plug towards a closed position. If a child pulls out the plug or the plug is otherwise removed from the outlet, the cover plates 2 slide to a closed position under the force of the springs 7 automatically safely preventing access to the outlet by a child.

The force of the springs 7 biasing the cover plates 2 to a closed position will prevent a child from accessing the electrical outlet since the child must slide the cover plate 2 against the spring force, hold the cover plate 2 in a fully open position with one hand against the spring force and insert metal objects or fingers in the electrically charged openings of the outlet with the other hand to access the outlet.

In order to add a further margin of safety, a cover for an electrical outlet in accordance with the invention may further include conventional resilient locking means to lock the cover plates 2 in the closed position as shown in FIG. 1.

The cover for an electrical outlet shown in FIG. 3 includes conventional resilient locking means for reversibly locking the cover plates 2 in the closed position shown in FIG. 1. The resilient locking means comprises wedge shaped locking tabs 15 projecting downwardly from the bottom surface of flanges 4 beneath a gap 16 formed in the upper surface of the flange 7 at either longitudinal edge of the base plate 1. Recesses 17 are provided in the rim 5 which coact with the tabs 15 to lock the cover plates 2 in the closed position.

Conventional locking means are released by applying an inwardly directed force in the direction normal to the cover plates 2 above the recesses 17, whereby the recesses 17 and locking tabs 15 are disengaged. The cover plate 2 flexes under the downward force into the gap 16. While applying this force the cover plate 2 can slide to a position exposing the access openings and outlet receptacle. As the cover plate slides from an open position to a closed position the leading rim portions 18 ride over the rearwardly tapered surfaces of the locking tabs 15. When the locking tab 15 and indentation 17 are in alignment, the cover plate 2 flexes back to its original shape, engaging locking tab 15 and recesses 17 in the closed and locked position.

The force exerted by the springs 7 is of a magnitude sufficient to slide the cover plates 2 and force the leading rim portions 18 to ride over the locking tabs 15 while forcing the cover plates 2 to flex.

In operation, therefore, starting from the closed and locked position shown in FIG. 1, a force is applied simultaneously to the cover plate top surface above the gaps 16. The cover plate 2 flexes inwardly into the gaps 16, the recesses 17 and the locking tabs 15 are disengaged, the cover plate 2, is unlocked and slides under manual force against the force exerted by the springs 7 to the open position show in FIG. 2 with the abutments 13 and 14 engaged.

To move from the open position to the closed position, the cover plate 2 slides under the force exerted by the springs 7 until the leading rim portions 18 touch the rearwardly tapered surfaces of the locking tabs 15. As the cover plate 2 moves toward the closed position, its speed increases. Under continuing force exerted by the springs 7 and inertia of the moving cover plate 2 the leading rim portions 18 ride over the locking tabs 15, flexing the cover plate 2 into the gaps 16. When the locking tabs 15 and the recesses 17 are aligned the cover plate 2 flexed back to its original shape so that the locking tabs 15 and the recesses 17 engage.

I claim:

1. A cover for a receptacle, comprising:
    a base plate having a top surface and a bottom surface, and having openings shaped to allow access to the receptacle;
    a cover plate having a top surface and a bottom surface;
    guide means to engage said base plate and cover plate together such that said cover plate may slide relative to said base plate between an open position and a closed position to alternately expose and cover said openings;
    a spring engaging said base plate and said cover plate, said spring exerting a force upon said cover plate biasing said cover plate from an open position to a closed position, said spring comprising a metal wire formed into a loop connected at its ends to the top surface of the base plate, and connected at its linear midpoint to the bottom surface of the cover plate whereby the spring is covered by the bottom surface of the cover plate when the cover plate is in the open and closed position.

2. A cover according to claim 1, wherein said cover plate comprises a first and second portion positioned symmetrically about the centre of the base plate, said first and second portion being slidable in opposite directions.

3. A cover according to claim 1 including stop means to limit the travel of the cover plate relative to the base plate comprising:
    an upper abutment projecting downwardly from the bottom surface of said cover plate; and
    a lower abutment projecting upwardly from the top surface of said base plate;
    whereby the upper and lower abutments engage when the cover plate slides to an open position exposing the outlet access openings.

4. A cover according to claim 3 wherein said spring comprises a metal wire formed into a loop connected at its ends to the top surface of the base plate and connected at its linear midpoint to said upper abutment of the cover plate by inserting the spring in a groove formed in the upper abutment.

5. A cover according to claim 1 wherein the wire is pivotally connected at its ends to the top surface of the base plate.

6. A cover according to claim 5 wherein said wire has a pin portion on both ends thereof perpendicular to the plane of said loop, and said top surface of said base plate has indentations for receiving said pin portions.

7. A cover according to claim 1 wherein said wire has symmetrical outer portions angularly offset, from the middle portion thereof, in the same direction within the plane of said loop.

8. A cover according to claim 7 wherein said offset angle is in the range of 5° to 15°.

9. A cover according to claim 1 including locking means to releasibly lock the cover plate in a closed position.

10. A cover according to claim 9 wherein said guide means comprise:
    inwardly opening longitudinal slots defined at opposing edges of said cover plate between the bottom surface and a peripheral bottom rim; and
    flanges defined along each edge of said base plate, said slots coacting with said flanges; and
    wherein said locking means comprise:
    a locking tab projecting downwardly from the bottom surface of each flange beneath a gap defined in the upper surface of each flange; and
    a recess defined in each rim positioned beneath each flange, so that said locking tabs and recesses engage when the cover plate is in a closed position.

* * * * *